United States Patent [19]

Off et al.

[11] 4,371,074
[45] Feb. 1, 1983

[54] TRANSPORT SYSTEM FOR AUTOMATIC POCKET IMPLANTATION APPARATUS

[75] Inventors: Joseph W. A. Off, Irving; Judson H. Early, Dallas; Daniel K. Roady, Dallas; Theodore B. Thayer, Dallas, all of Tex.

[73] Assignee: Haggar Company, Dallas, Tex.

[21] Appl. No.: 170,750

[22] Filed: Jul. 21, 1980

[51] Int. Cl.³ .............................................. B65G 47/74
[52] U.S. Cl. .................................... 198/339; 198/479; 198/653; 198/695; 223/44
[58] Field of Search .............. 198/339, 345, 346, 653, 198/695, 696, 479, 486; 223/44

[56] References Cited

U.S. PATENT DOCUMENTS

| | | | |
|---|---|---|---|
| 4,156,293 | 5/1979 | Off | 2/247 |
| 4,226,661 | 10/1980 | Off et al. | 156/358 |
| 4,231,466 | 11/1980 | Rathert | 198/479 |
| 4,257,513 | 3/1981 | Siarto | 198/345 |

OTHER PUBLICATIONS

Bulletin TW-70C from Ferguson Machine Co. of St. Louis, Mo., re Trans-O-Mator Machine.
"In-Line Transfer", Ferguson Machine Co., 11820 Lackland Rd., St. Louis, Mo. 63141, ©1972.

Primary Examiner—Robert B. Reeves
Assistant Examiner—Douglas D. Watts
Attorney, Agent, or Firm—Richards, Harris & Medlock

[57] ABSTRACT

A system (10) for transporting sets of garment panels and pocket bags through work stations functioning to implant substantially finished pockets in the garment panels includes a transfer machine (12) with an endless belt (24) mounted for movement around the machine, and a plurality of carriers (14) secured to the belt. A template (46) is mounted on each carrier (14) for releasably holding a garment panel and pocket bag in proper relationship as the carriers are indexed. Means (60), (110) are provided for selectively opening the templates (46) for loading and unloading.

6 Claims, 7 Drawing Figures

TRANSPORT SYSTEM FOR AUTOMATIC POCKET IMPLANTATION APPARATUS

TECHNICAL FIELD

The present invention relates generally to an apparatus for implanting pockets in garment panels during garment construction. More particularly, this invention involves a system for transporting sets of pocket blanks and garment panels between work stations of an apparatus for automatically implanting pockets into the garment panels.

BACKGROUND ART

In the manufacture of garments, pockets are provided as a means for conveniently carrying useful items such as currency, change, keys, a wallet, a handkerchief and the like. The pockets are integrated into the garment and take the general form of a pouch open at one end to receive such items.

The two basic types of pocket constructions are the patch-type pocket and the regular pocket. The patch-type pocket is secured to the outside surface of the garment and is typically utilized in garments having less formal or leisure applications. Patch pockets are relatively easily constructed and attached to a garment.

In contrast, the regular pocket is positioned inside the garment thereby presenting a much neater, finished appearance. An opening, usually a slot in the garment, provides access to the standard pocket. However, the regular pocket is relatively complicated in construction and has required numerous manual operations including material cutting, positioning, sewing and trimming. Such manual operations are time consuming and can contribute significant expense to the cost of manufacturing a garment. Since the garment industry is characterized by high volume production, it will be appreciated that the overall costs of constructing and finishing such pockets can be substantial.

In an attempt to improve upon the manual sewing techniques of the prior art, there has been increasing interest in the use of adhesive as a supplement or complete substitute for sewn stitches. For example, U.S. Pat. No. 4,156,293 to Joseph W. A. Off discloses a pocket construction wherein a garment panel and rectangular pocket blank are secured together and formed into a finished pocket through various folding and adhesive connection steps. Application Ser. No. (B7685), to Joseph W. A. Off and Judson H. Early discloses an apparatus for manufacturing prefabricated pocket bags like that shown in U.S. Pat. No. 4,156,293. Application Ser. No. (B7410), to Joseph W. A. Off and Judson H. Early discloses an apparatus for integrating prefabricated pocket bags into garment panels on a semi-automatic basis wherein each pocket bag and corresponding garment panel are clamped in a template and manually advanced between work stations of the apparatus, however, the production capability of this apparatus is somewhat limited. All of these inventions are assigned to Haggar Company of Dallas, Texas.

Although the adhesive pocket construction techniques developed thus far have proven satisfactory, a need has arisen for an apparatus for transporting and indexing sets of garment panels and prefabricated pocket bags between work stations to achieve greater rates of production.

SUMMARY OF INVENTION

The present invention comprises a transport and index apparatus which overcomes the foregoing and other difficulties associated with the prior art. In accordance with the invention, there is provided an apparatus for precision transport of a plurality of sets of garment panels and prefabricated pocket bags during indexing through various work stations to form garment panels with finished pockets constructed therein. Each garment panel and corresponding prefabricated pocket bag are held in proper relationship by a movable template clamp assembly, a plurality of which are provided. The system herein allows construction of garment panels with substantially finished pockets at greater production rates to reduce overall fabrication costs of the garment.

More particularly, the present invention comprises the transport system for an automatic apparatus for implanting pockets in garment panels. The apparatus includes a table with an endless belt mounted for movement around the periphery thereof and a drive system for indexing the belt. A plurality of carriers are secured to the movable belt. Each carrier includes a template clamp assembly adapted to releasably receive a garment panel and prefabricated pocket bag for transport between work stations situated around the table. The templates are normally biased in closed positions by springs, however, means are provided at the loading and unloading stations for opening the templates. Also located at the loading station is a control panel interfaced with a microprocessor controller for controlling the system.

BRIEF DESCRIPTION OF DRAWINGS

A fuller understanding of the invention can be had by reference to the following Detailed Description in conjunction with the accompanying Drawings, wherein.

DETAILED DESCRIPTION

Figure 1:
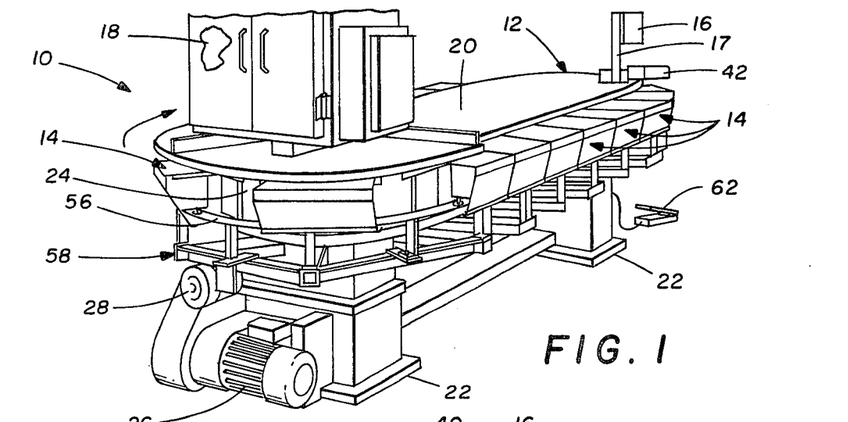
FIG. 1 is a perspective view of a portion of an apparatus for implanting pockets incorporating the invention.

Referring now to the Drawings, wherein like reference numerals designate like or corresponding parts throughout the views, and particularly referring to FIG. 1, there is shown a system for implanting pockets 10 incorporating the invention. System 10 is particularly adapted for operation on a continuous basis to construct pockets in accordance with the techniques of U.S. Pat. No. 4,156,293 utilizing prefabricated pocket bags like those fabricated with the device shown in application Ser. No. (B7685), which inventions are assigned to Haggar Company as is the present one.

System 10 includes a transfer machine 12 with a plurality of carriers 14 mounted for movement there-around. In the preferred embodiment, system 10 includes about eighteen carriers 14. A control box 16 is situated at one end of machine 12 at the loading station of apparatus 10. Control box 16 is interfaced with a microprocessor 18 within a cabinet located at the opposite end of machine 12. Microprocessor 18 functions to control operations at the various stations of system 10, which have been omitted for clarity inasmuch as the subject matter of the present application is directed primarily toward the transport portion of system 10. In actual practice, however, it will be appreciated that several work stations are mounted around transfer machine 12 to carry out various cutting, folding, adhesive application and bonding steps as carriers 14 are indexed between the stations.

Transfer machine 12 itself is of substantially conventional construction, and comprises a table top 20 supported on pedestals 22. A segmented belt 24 is mounted for movement around table top 20. Belt 24 is driven intermittently by a precision drive system including a clutch/brake motor 26 and anti-backlash speed reducer 28 coupled to a studded drum (not shown) located beneath table top 20 for engaging belt 24 to advance carriers 14. Transfer machine 12 can comprise a TRANS-O-MATOR type AW machine available from Ferguson Machine Company of St. Louis, MO, for example; however, other machines of suitable construction and precision can be utilized, if desired.

Figure 2:
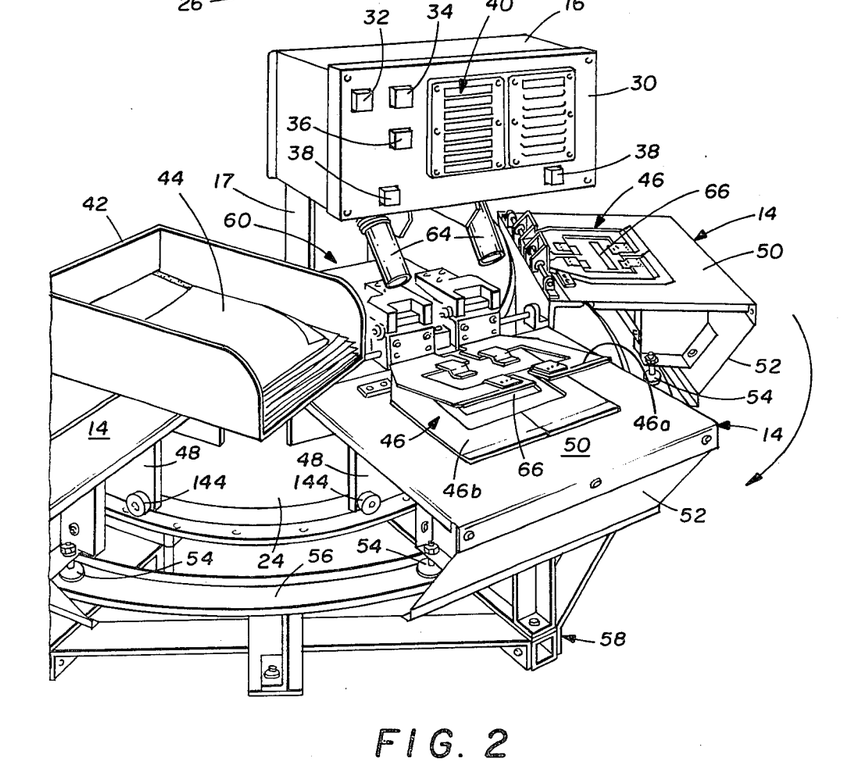
FIG. 2 is an enlarged perspective view of the loading station.

Referring now to FIG. 2, further details of the loading station of system 10 can be seen. Control box 16 includes a panel 30 having several switches 32, 34, 36 and 38 and enunciator panel 40 for use by the operator responsible for loading carriers 14. A tray 42 is provided adjacent to control box 16 for holding a supply of prefabricated pocket bags 44 for loading into templates 46 of carriers 14 together with garment panels (not shown), as will be more fully explained hereinafter. Each carrier 14 comprises a back plate 48, top plate 50 and front plate 52. The back plate 48 of each carrier 14 is secured to belt 24 for movement therewith. The front plates 52 act as protective guards. Templates 46, each of which includes a pivotal upper portion 46a and pivotal lower portion 46b, are mounted on top plates 50 of carriers 14.

Each carrier 14 is further supported by a pair of glides 54, only one of which can be seen on each carrier in FIG. 2. Glides 54 can be formed of TEFLON brand material, and are similar to chair glides. Glides 54 of carriers 14 are movable on a rail 56 surrounding transfer machine 12. Rail 56 is mounted on a support structure 58 comprising a framework of horizontal and vertical members affixed to machine 12. Opening of template 46 at the loading station is controlled by an assembly 60, which is shown in more detail in FIGS. 3 and 4.

Referring still to FIG. 2, the loading sequence for carriers 14 goes as follows. First, pushbutton 34 is depressed to start up and initialize system 10. The pivotal positions of template portions 46a and 46b are controlled by opening assembly 60 via foot switch 62, which is shown in FIG. 1. After both portions of template 46 have been pivoted upwardly, a garment panel is positioned on top plate 50 of carrier 14 before foot switch 62 is actuated to lower template portion 46b clamping and clamp it in place. Any type of garment panel requiring implantation of a pocket therein can be utilized with system 10. For example, in the case of trousers or pants, the upper portion of a pants panel would be clamped between template portion 46b and top plate 50 with the lower portion of the panel hanging over the edge of carrier 14.

A prefabricated pocket bag 44 is then inserted between template portions 46a and 46b, followed by actuation of foot switch 62 again to lower the upper template portion and thus clamp the pocket bag in place. If desired, twin light sources 64 can be mounted underneath control box 16 to project reference beams or cross hairs of light onto a carrier 14 positioned at the loading station to facilitate manual positioning of the garment panel and prefabricated pocket bag 44 relative to template 46.

A beep tone eminates from control box 16 prior to automatic indexing of the next carrier 14. If the loading sequence is not sufficientaly complete at the beep tone, the operator would then depress pushbutton 36 to initiate a predetermined delay timeout to allow completion of loading before advancement of carriers 14. On the other hand, the operator could depress push buttons 38 if loading were completed before the beep tone to initiate early advancement of carriers 14. It will thus be apparent that indexing of carriers 14 of system 10 normally occurs at programmable preset intervals which can be extended or shortened by means of switches 36 or 38, respectively.

Switch 32 comprises an emergency pushbutton for stopping advancement of carriers 14 and all other moving components of system 10 in the event of a hangup or other emergency condition. Enunciator panel 40 which is coupled to various sensors that monitor performance of system 10 via microprocessor 18 functions to notify the operator of conditions, such as low pressure or vacuum levels, which could adversely affect performance of the system so that appropriate corrective action can be taken.

Figure 3:
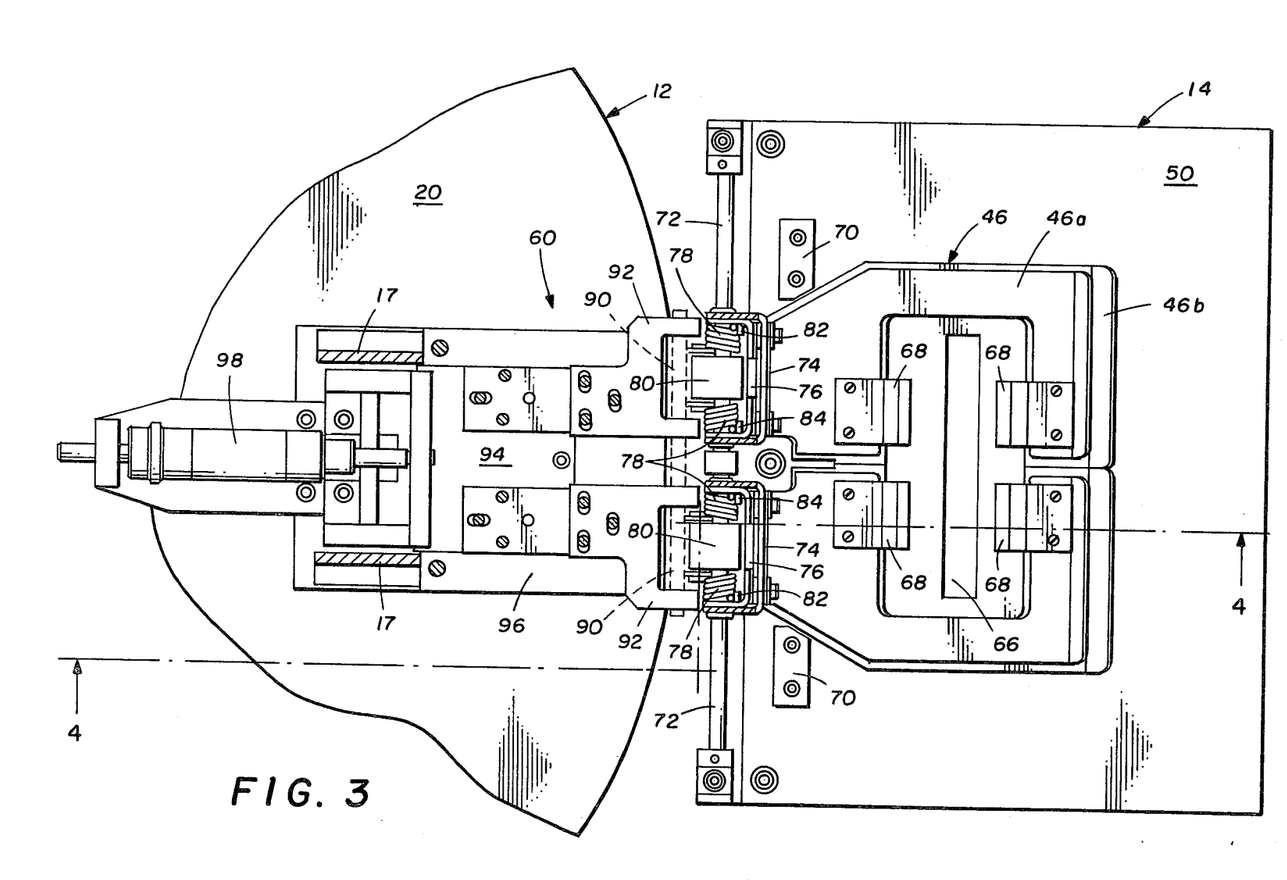
FIG. 3 is a top view of a movable carrier positioned at the loading station with the template thereon closed.
Figure 4:
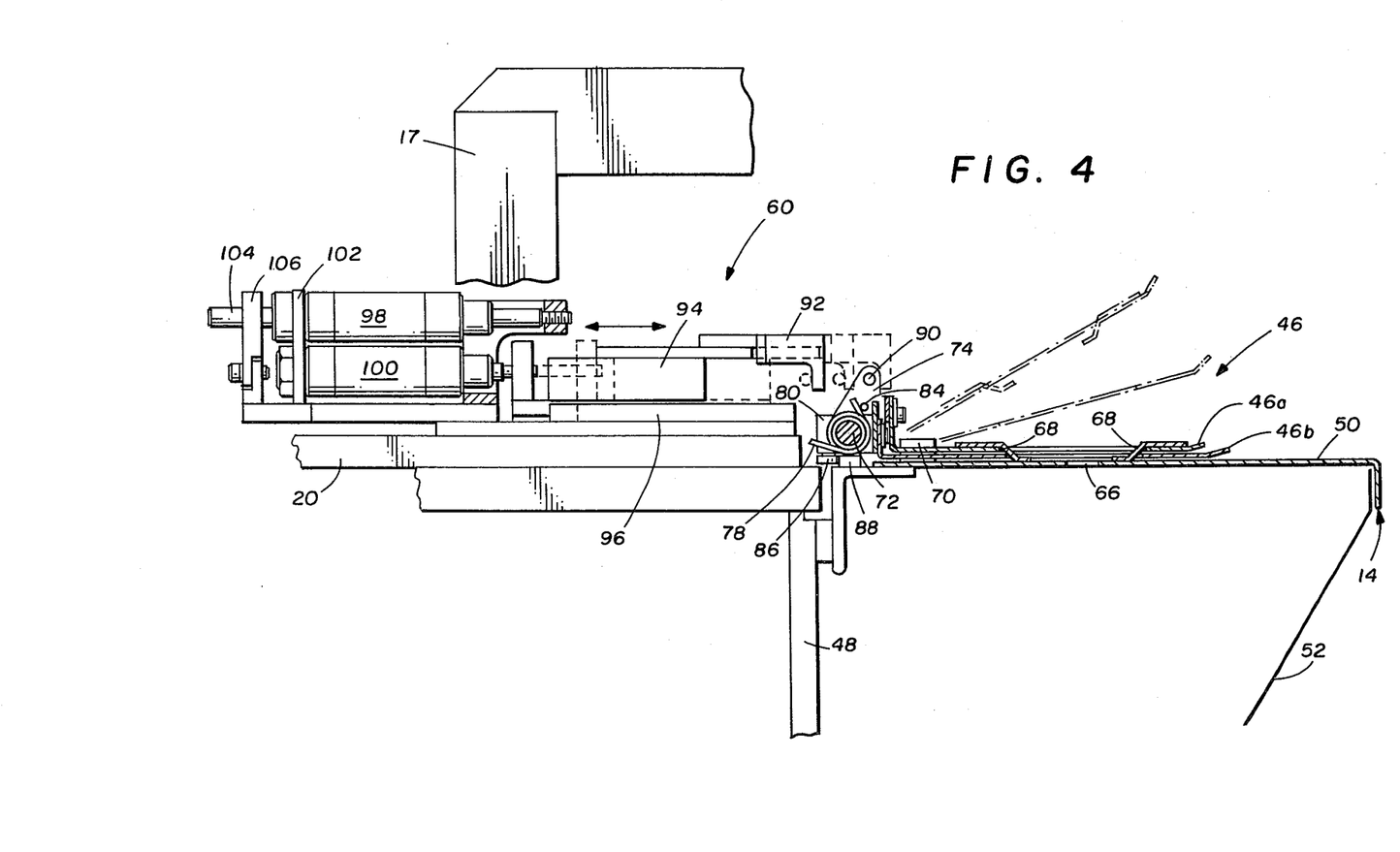
FIG. 4 is a side view of FIG. 3 showing the open position of the template in phantom lines.

Referring now to FIGS. 3 and 4, there are shown further constructional details of template 46 and the assembly 60 for opening the template at the loading station. Template portions 46a and 46b are each of split construction, with the sections of each portion being generally C-shaped and facing inwardly. Each portion of template 46 thus defines a generally rectangular opening which is positioned over a relatively smaller rectangular opening 66 in top plate 50 of each carrier 14. Four clips 68 are provided on upper template portion 46a for exerting additional clamping pressure on the garment panel and pocket bag (not shown) around opening 66. Top plate 50 also includes a pair of guide blocks 70 mounted thereon for centering template 46 in the down position.

The portions of template 46 are mounted for pivotal movement about half shafts 72 located at the rear edge of each carrier 14. The sections of upper template portion 46a are secured to outer yokes 74, while the sections of lower template portion 46b are secured to inner yokes 76. Yokes 74 and 76 in turn are mounted on half shafts 72 for sliding and rotating movement. Template portions 46a and 46b are normally biased in the down or clamping position against top plate 50 by torsion springs 78, two of which are provided for each corresponding pair of yokes 74 and 76. A block 80, which is slidable on one of the half shafts 72, is provided between each pair of springs 78. One end of each spring 78 reacts against an integral ledge provided on its corresponding block 80. The other ends of the outer pair of springs 78 engage pins 82 on inner yokes 76. The other ends of the inner pair of springs 78 engage pins 84 on outer yokes 74. Blocks 80 are constrained against rotation about half shafts 72 by rollers 86 mounted on the blocks in engagement with fixed bars located at the rear of carriers 14.

It will thus be apparent that the portions of template 46 are supported for pivotal and slidable motion along half shafts 72, and are normally biased in the down position by springs 78.

Referring still to FIGS. 3 and 4, opening assembly 60 is adapted for selective pivotal actuation of template 46 on each carrier 14. As is best seen in FIG. 4, a rod 90 extends between the sides of each outer yoke 74. The sides of outer yokes 74 and rods 90 have been broken away in FIG. 3 for clarity, however, the retracted positions of the rods have been shown in phantom. An L-shaped hook 92, which comprises a portion of assembly 60, is associated with each pin 90 and corresponding support yoke assembly. Hooks 92 are secured to a block 94 which is supported for sliding movement on a gib 96.

Movement of hooks 92 between the positions shown in full and phantom lines in FIG. 4 is effected by a pair of double-acting cylinders 98 and 100 connected in parallel. Cylinders 98 and 100 are secured together by a plate 102. The piston rod of upper cylinder 98 is connected to a base plate on which gib 96 is mounted for carrying block 94. An extension 104 at the other end of cylinder 98 protrudes through an opening in a bracket 106 secured to the base plate. Extension 104 and the corresponding opening in bracket 106 are preferably of non-circular cross section to prevent rotation of cylinder 98 during operation. The piston rod of lower cylinder 100, which is secured to upper cylinder 98, is connected directly to sliding block 94. Incremental extension or retraction of hooks 92 can thus be achieved with cylinders 98 and 100.

It will thus be apparent that assembly 60 is operable to raise or lower the template 46 of each carrier 14 for loading a garment panel and prefabricated pocket bag 44 thereinto. Hooks 92 are normally located in the outermost position, shown in phantom lines in FIG. 4, such that yokes 74 and rods 90 can pass underneath the hooks. Once a carrier 14 has stopped at the loading station, cylinders 98 and 100 are both retracted to pivot the template portions 46a and 46b to the open positions shown in phantom lines in FIG. 4. Yokes 74 and 76 are sized to interfere with each other during pivotal movement so that upper template portion 46a opens first followed by lower template portion 46b. After the garment panel has been positioned on top plate 50, cylinder 100 is relaxed allowing lower template portion 46b to close under the actions of springs 78. After the prefabricated pocket bag 44 has been positioned over template portion 46b, cylinder 98 is relaxed allowing upper template portion 46a to complete closure under spring action.

Figure 5:
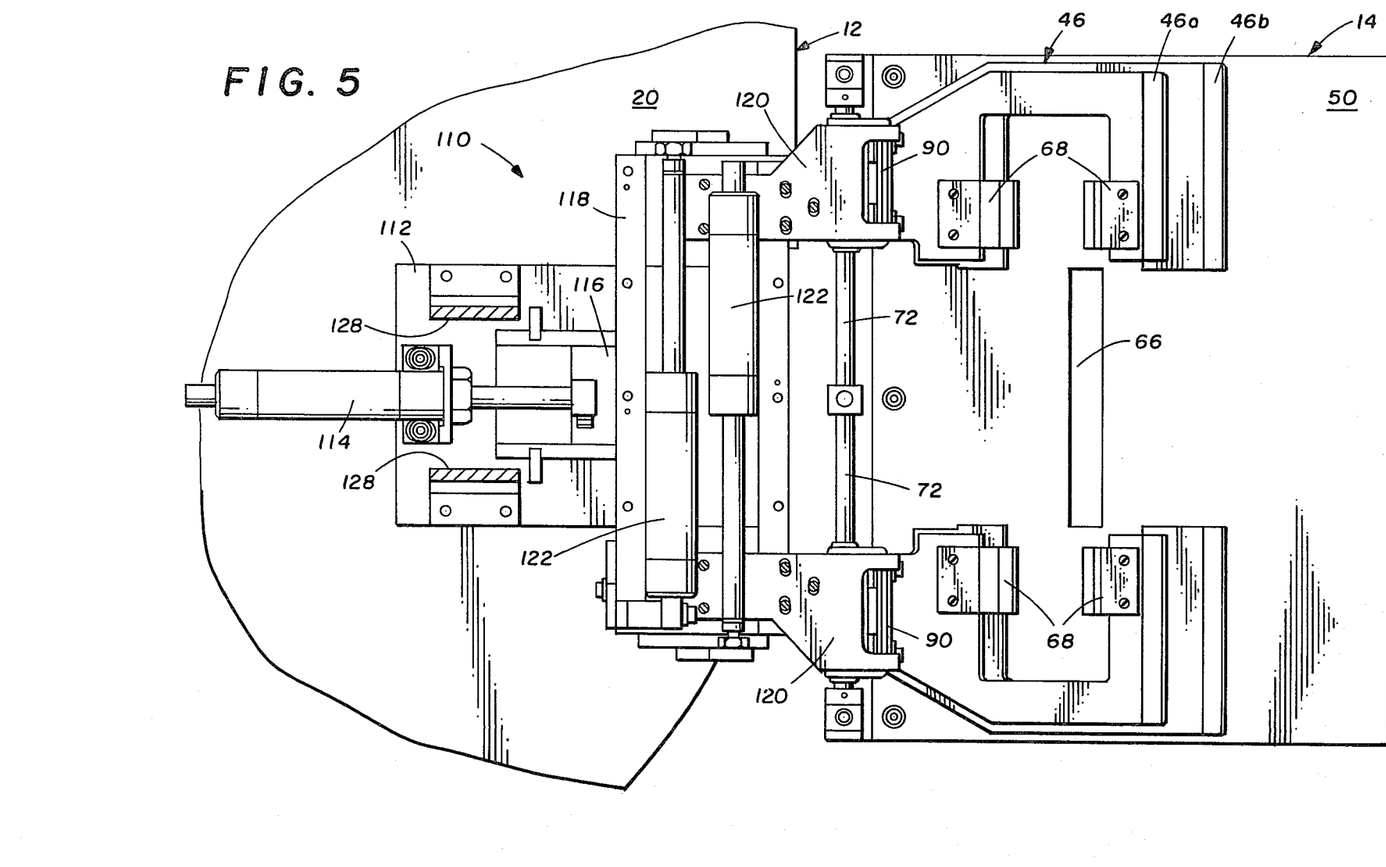
FIG. 5 is a top view of a carrier positioned at the unloading station with the template thereon open.
Figure 6:
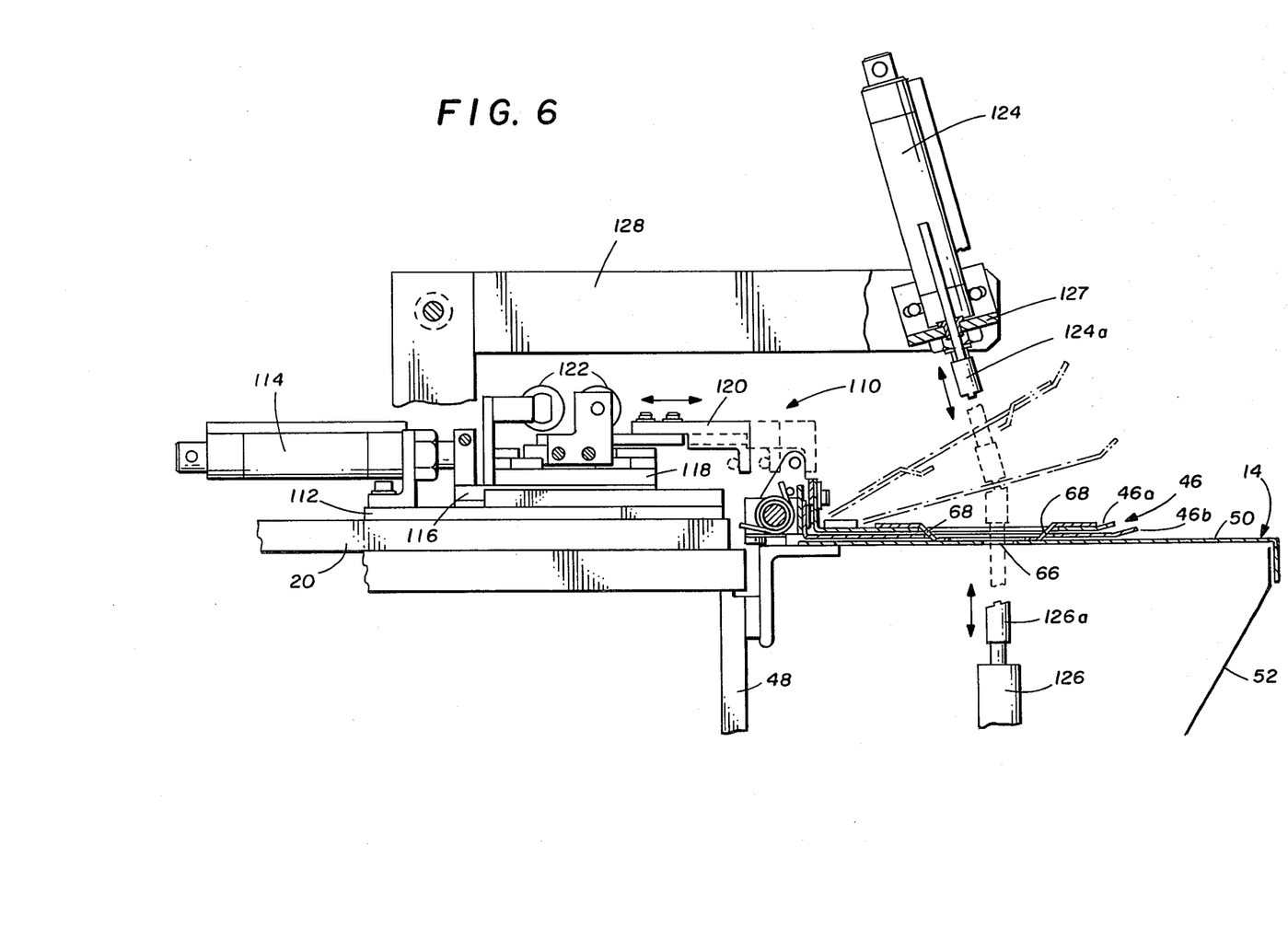
FIG. 6 is a side view (partially cutaway) of FIG. 5 showing the open and spread position of the template in phantom lines.

Referring now to FIGS. 5 and 6, there is shown an assembly 110 which is utilized to open and spread the template 46 of each carrier 14 at the unloading station of system 10 for removal of the finished garment panels. Assembly 110 includes a base plate 112 secured to table top 20 of machine 12. Attached to plate 112 is a double-acting cylinder 114 whose piston rod is coupled to a block 116 mounted on plate 112 for sliding movement toward and away from carriers 14. Block 116 supports a second block 118 on which hooks 120 are mounted for sliding movement toward and away from each other in a direction transverse to movement of the first block. A pair of double-acting cylinders 122 are secured to second block 118, with the piston rod of one cylinder being coupled to one hook 120 and the piston rod of the other cylinder being connected to the other hook. Hooks 120 are substantially similar to hooks 92 of assembly 60 shown in FIGS. 3 and 4, and function to engage rods 90 on yokes 74 in similar fashion.

After a carriage 14 has completed indexing through the various work stations of system 10 to implant a prefabricated pocket bag 44 into a garment panel, the finished garment panel must be unloaded from the carriage before reloading. Upon arrival at the unloading station, of course, template portions 46a and 46b are closed in a down position against top plate 50 of carriage 14. Cylinder 114 is then retracted to pivot template portions 46a and 46b upwardly to positions similar to those shown in phantom lines in FIG. 4. Cylinders 122 are then extended to spread apart the sections of template portions 46a and 46b to the positions shown in FIG. 5, thereby releasing the finished garment panel for collection by an attendant. After passage of a predetermined time interval, as controlled by microprocessor 18, cylinders 114 and 122 are actuated in opposite directions to return template 46 to its initial position in preparation for the next advancement of carriages 14.

In accordance with the preferred construction, upper and lower double-acting cylinders 124 and 126 as included in assembly 110, as shown in FIG. 6, for immobilizing the finished garment panel as template portions 46a and 46b are spaced apart. Cylinders 124 and 126 have been omitted from FIG. 5 for clarity. Upper cylinder 124 is mounted on a plate 127 attached to a bracket 128. Lower cylinder 126 is mounted on structure underneath the unloading station. When template 46 opens, the heads 124a and 126a of cylinders 124 and 126 respectively, come together as shown in phantom lines momentarily to pinch or clamp the garment panel as template portions move outwardly so that the panel can be removed before the template closes and carriers 14 advance again.

Figure 7:
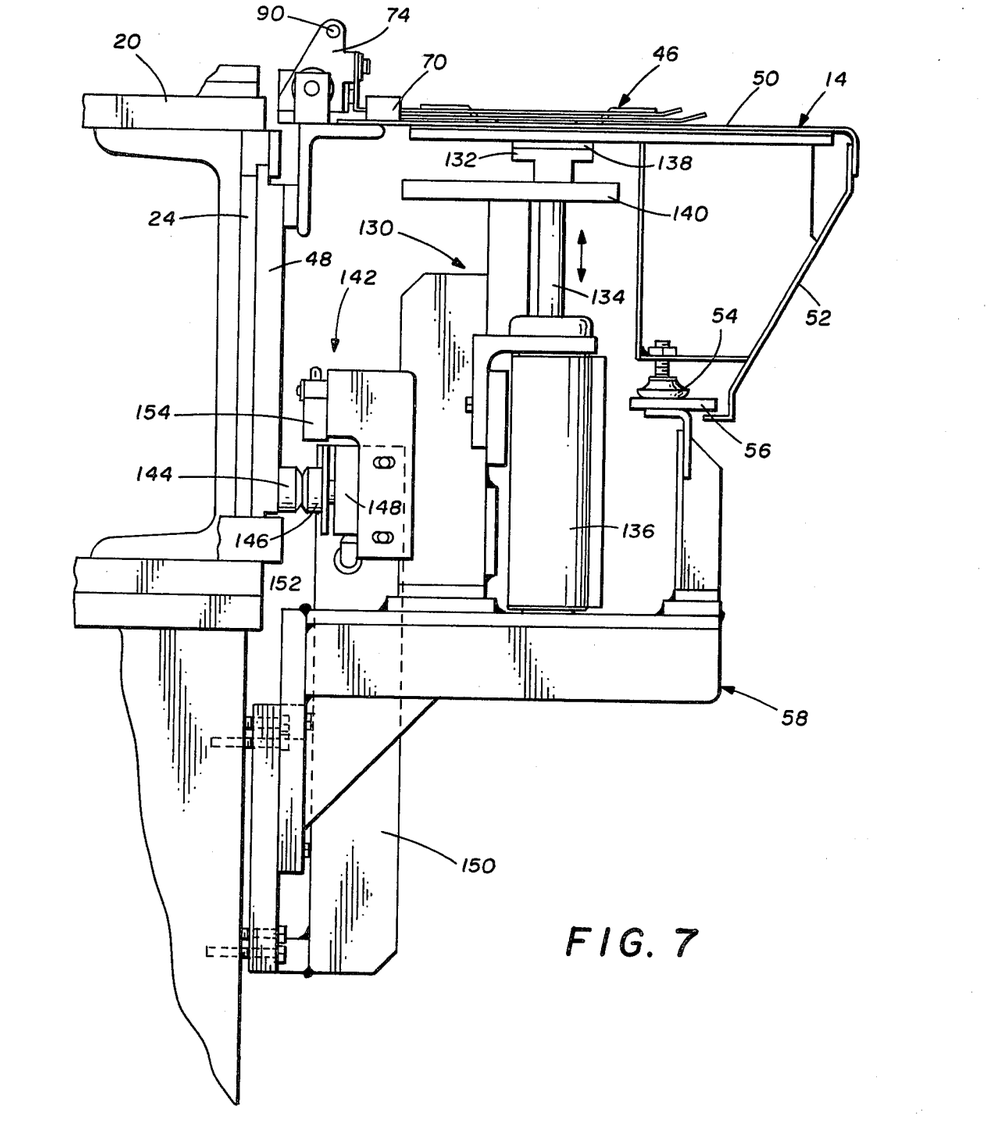
FIG. 7 is an end view of a station including a stabilizer and movable backup anvil.

Referring now to FIG. 7, there are shown two optional attachments which are utilized in the preferred embodiment of system 10. A backup assembly 130 is preferably provided at each working station around transfer machine 12 for providing additional support to carriers 14. For example, a backup assembly 130 can be mounted at each work station wherein a clamping force is applied to the garment panel and prefabricated pocket bag 44 through the template 46 on a carrier 14. Each assembly 130 can be mounted directly on support structure 58 surrounding transfer machine 12.

Assembly 130 comprises an anvil 132 secured to the end of a piston rod 134 of a double-acting cylinder 136. The top face of anvil 32 is profiled to engage the underside of top plate 50 around opening 66 in accordance with the type of clamping and/or bonding contact being applied at that particular work station. For example, anvil 132 can be provided with a pad 138 of TEFLON brand material configured to substantially fill opening 66 in top plate 50. Assembly 130 further includes a smooth shield 140 surrounding piston rod 134 to prevent snagging of any material drooping over carriers 14 as the carriers are indexed.

A stabilizer assembly 142 is preferably provided at those work stations located near or on the ends of transfer machine 12. As belt 24 rounds the ends of machine 12, some play could develop between back plate 48 and the belt which would interfere with precise location of each carrier 14. A pair of buttons 144, only one of which is shown in FIG. 6, are thus provided on back plate 48 of each carrier 14 for engagement with a mating button 146 of assembly 142. Button 146 is actuated by a double-acting pancake cylinder 148 on a bracket 150 fixed to support structure 58. Upon arrival of a carrier 14 at such a station, cylinder 148 is actuated to clamp back plate 48 thereby taking out any play or wobble of that carrier and stabilizing it. A metal flange 152 is attached to button 146 for sensing by a magnetic sensor 154 to monitor the on/off condition of stabilizer assembly 142. Cylinder 148, of course, is only actuated between advancements of carriers 14.

From the foregoing, it will be apparent that the present invention comprises a transport system for a pocket implantation apparatus having numerous advantages over the prior art. The invention includes a plurality of carriers each of which can be loaded with a garment panel and prefabricated pocket bag for indexing through various work stations to construct garment panels with substantially finished pockets which then can be assembled into entire garments. The present invention eliminates many manual operations which have heretofore typified pocket construction, thereby achieving significant savings in the overall cost of fabricating garments. Other advantages will be apparent to those skilled in the art.

Although particular embodiments of the invention have been illustrated in the accompanying Drawings and described in the foregoing Detailed Description, it shall be understood that the invention is not limited to the embodiments disclosed, but is intended to embrace any alternatives, equivalents, modifications and/or rearrangements of elements falling within the spirit and scope of the invention as defined by the following Claims.

We claim:

1. In a transfer machine of the type comprising a plurality of work stations situated around a predetermined course, an endless belt mounted for movement around the predetermined course and means for incrementally advancing the endless belt, the improvement comprising:
   a plurality of carriers each secured to the endless belt for movement thereby around the predetermined course;
   each of the carriers comprising:
      a top plate;
      a first template;
      means supporting the first template on the top plate for pivotal movement about an axis extending parallel to the top plate between a closed position wherein the first template engages the top plate to clamp a first object therebetween and an open position wherein the first template extends at a substantial angle with respect to the top plate;
      a second template overlying the first template;
      means supporting the second template on the top plate between a closed position wherein the second template engages the first template to clamp a second object therebetween and an open position wherein the second template extends at a substantial angle with respect to the top plate; and
      means mounted at one of the work stations on the predetermined course for first pivoting both of the templates to the open positions, for subsequently pivoting the first template only to the closed position to clamp the first object between the first template and the top plate, and for finally pivoting the second template to the closed position to clamp the second object between the second template and the first template.

2. The improvement according to claim 1 wherein the template pivoting means comprises:
   hook means mounted at said one of the work stations on the predetermined course;
   structure on the first and second templates positioned for engagement by the hook means;
   said endless belt for aligning the structure of the first and second templates with the hook means; and
   means for retracting the hook means to engage the structure of the first and second templates and thereby pivot the first and second templates to the open positions.

3. The improvement according to claim 2 wherein the first and second templates each comprise opposed C-shaped portions defining an opening therebetween, wherein the means supporting the first and second templates for pivotal movement also support the portions of the templates for sliding movement relative to the top plate between closed positions wherein the C-shaped portions of each template engage one another to close the aperture therebetween and open positions wherein the C-shaped portions of each template are substantially spaced apart and the aperture therebetween is open, and means mounted at one of the work stations along the predetermined course for selectively opening and subsequently closing the opposed C-shaped portions of the templates.

4. In a transfer machine of the type comprising a plurality of work stations situated around a predetermined course, an endless belt mounted for movement around the predetermined course and means for incrementally advancing the endless belt, the improvement comprising:
   a plurality of carriers each secured to the endless belt for movement thereby around the predetermined course;
   each of the carriers comprising:
      a top plate;
      a first template comprising opposed, C-shaped portions;
      means supporting the first template on the top plate for pivotal movement about an axis extending parallel to the top plate between a closed position wherein the first template engages the top plate to clamp a first object therebetween and an open position wherein the first template extends at a substantial angle relative to the top plate;
      means supporting the opposed C-shaped portions comprising the first template for sliding movement relative to the top plate between a closed position wherein the C-shaped portions of the first template engage one another to define a closed aperture therebetween and an open position wherein the C-shaped portions of the first template are substantially spaced apart;
      a second template overlying the first template;
      means supporting the second template on the top plate for pivotal movement about an axis extending parallel to the top plate between a closed position wherein the second template engages the first template to clamp a second object therebetween and an open position wherein the second template extends at a substantial angle with respect to the top plate;

means supporting the opposed, C-shaped portions of the second template for sliding movement between a closed position wherein the C-shaped portions of the second template engage one another to define a closed aperture therebetween and an open position wherein the C-shaped portions of the second template are substantially spaced apart; and means mounted at one of the work stations along the predetermined course for selectively pivoting the first and second templates between the open and closed positions and for selectively sliding the opposed, C-shaped portions comprising the first and second templates between the open and closed positions.

5. The improvement according to claim 4 wherein the template pivoting means comprises:

hook means mounted at said one of the work stations on the predetermined course;

structure on the first and second templates positioned for engagement by the hook means;

said endless belt for aligning the structure of the first and second templates with the hook means; and means for retracting the hook means to engage the structure of the first and second templates and thereby pivot the first and second templates to the open positions.

6. In a transfer machine of the type comprising a plurality of work stations situated around a predetermined course, an endless belt mounted for movement around the predetermined course and means for incrementally advancing the endless belt, the improvement comprising:

a plurality of carriers each secured to the endless belt for movement thereby around the predetermined course; each of the carriers comprising:

a top plate;

a first template comprising opposed, C-shaped portions;

means supporting the first template on the top plate for pivotal movement about an axis extending parallel to the top plate between a closed position wherein the first template engages the top plate to clamp a first object therebetween and an open position wherein the first template extends at a substantial angle relative to the top plate;

means supporting the opposed C-shaped portions comprising the first template for sliding movement relative to the top plate between a closed position wherein the C-shaped portions of the first template engage one another to define a closed aperture therebetween and an open position wherein the C-shaped portions of the first template are substantially spaced apart;

a second template overlying the first template;

means supporting the second template on the top plate for pivotal movement about an axis extending parallel to the top plate between a closed position wherein the second template engages the first template to clamp a second object therebetween and an open position wherein the second template extends at a substantial angle with respect to the top plate;

means supporting the opposed, C-shaped portions of the second template for sliding movement between a closed position wherein the C-shaped portions of the second template engage one another to define a closed aperture therebetween and an open position wherein the C-shaped portions of the second template are substantially spaced apart;

means mounted at one of the work stations along the predetermined course for selectively pivoting the first and second templates between the open and closed positions and for selectively sliding the opposed, C-shaped portions comprising the first and second templates between the open and closed positions; and means mounted at another of the work stations on the predetermined course for first pivoting the first and second templates to the open positions, for subsequently pivoting the first template only to the closed position to clamp a first template only to the closed position to clamp a first object between the first template and the top plate, and for finally pivoting the second template to the closed position to clamp a second object between the second template and the first template.

* * * * *